June 18, 1940.  G. A. H. NUYTS  2,204,690
QUICK OPENING ENVELOPE
Filed Dec. 20, 1937  3 Sheets-Sheet 1
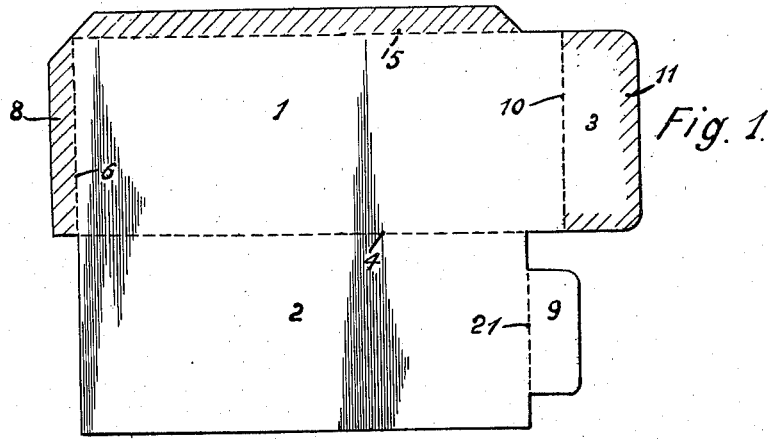
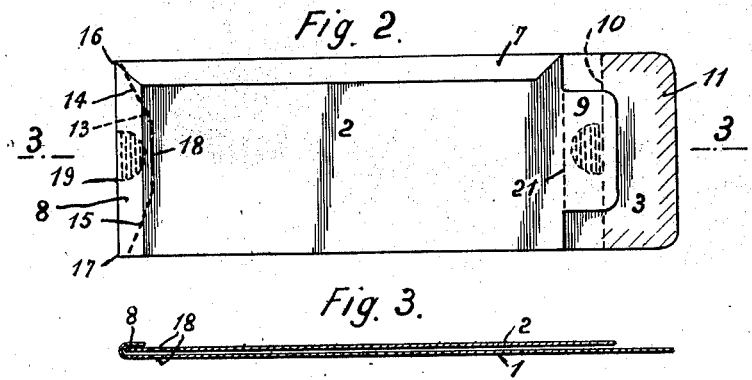
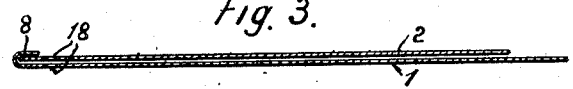
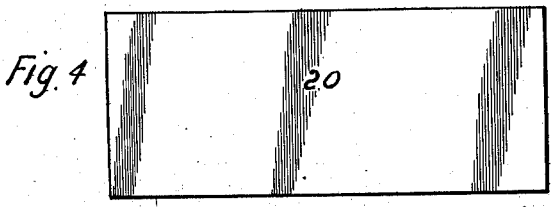
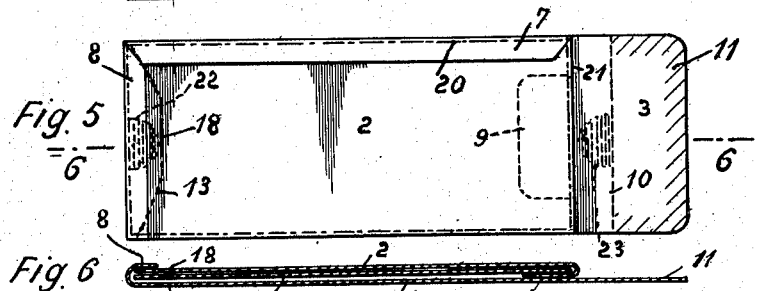
G. A. H. Nuyts
INVENTOR
By: Glascock Downing & Seebold
Attys.

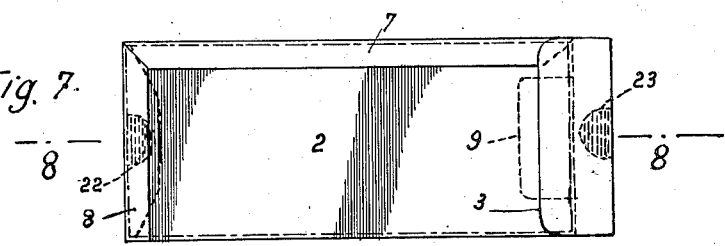
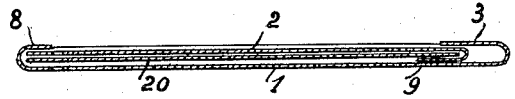
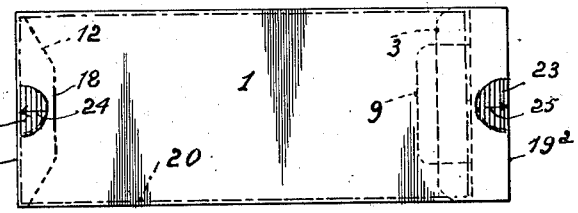
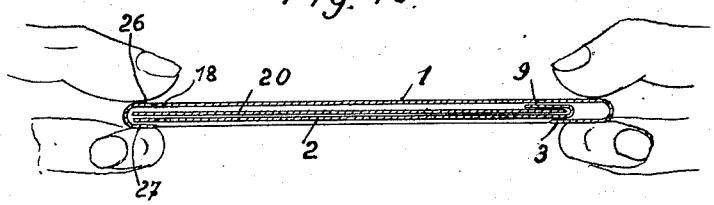
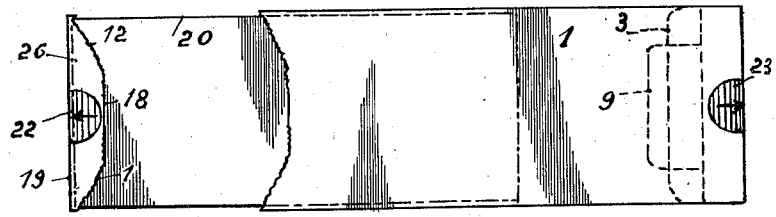

Patented June 18, 1940

2,204,690

UNITED STATES PATENT OFFICE 2,204,690

QUICK OPENING ENVELOPE

Georges Alfred Hippolyte Nuyts, Nanterre, France, assignor to United States Envelope Company, Worcester, Mass., a corporation of Maine Application December 20, 1937, Serial No. 180,877
In France November 26, 1937

9 Claims. (Cl. 229—85)

The present invention relates to an envelope, for letters and the like, which is utilizable in a particularly advantageous manner for postal purposes, and is characterized by the fact that the opening of same for access to its contents is readily effected by a simple pull, which divides the envelope into two parts by breaking the same at a predetermined place, and also by the fact that such breaking does not tear or damage the letter or other contents which is enclosed within the envelope.

My invention contemplates an envelope having a zone which is intentionally of lower tensile strength than the remainder of the envelope's walls, thus to facilitate its division into two parts, and within said envelope a sheet which is of such form or is arranged in such a manner that it is not subjected to the pull, in opposite directions, by which the envelope itself is fractured at said zone in the act of opening same.

For this purpose, the letter, sheet, or other article which constitutes the envelope's enclosure is so arranged as to incompletely fill the envelope, and the part of the envelope thus left empty is utilized for being gripped by one of the hands of the person desiring to open the envelope.

According to one embodiment, the enclosure, after folding or not as required, may be of smaller size than the envelope in the direction along which the opening pull has to be exerted and is held away from one of the ends where the envelope is pinched for exertion of the opening pull. This positioning of the enclosure can be effected by means of a tab projecting from the envelope at the orifice of same and which is folded inwardly after the enclosure has been inserted.

Preferably, said tab is of such length that, if it is not folded inside, it hinders the folding of the flap of the envelope for closing same. The user is thus obliged to make the necessary gesture of placing the enclosure in the correct position before closing the envelope. Said positioning can also be effected by sticking the two faces of the envelope against each other at the place not occupied by the enclosure, when the envelope is being closed.

In another embodiment, the enclosure may be of substantially the same size as the envelope in which it is inserted, but has one or more recessed portions which correspond to one of the spots provided for pinching the envelope in the act of opening same.

Preferably, the enclosure is so arranged that it is pinched with the envelope at only one of the two pinching spots indicated on the envelope's exterior for the application of the opening pull.

Under these conditions, when the envelope is fractured by said pull, the enclosure participates in the movement of one of the parts of the envelope, so that with a single movement the envelope is opened and the enclosure extracted therefrom.

This leaves one of the envelope parts to be used, if desired, as a sheath in which the enclosure can be stored. It is always an easy matter to extract said enclosure from the sheath, owing to the fact that the enclosure extends beyond the open end of the sheath.

In the simplest manner, the zone of lower tensile strength of the envelope is obtained by perforation. The perforations preferably provide a definite discontinuity of the envelope material at the spot where they are intersected by the line of application of the pull, so that the fracture is certain to take place.

A number of embodiments of an envelope according to the invention will be described hereinafter by way of example, with reference to the accompanying drawings in which:

Fig. 1 is a plan view of the blank for an envelope embodying my invention;

Fig. 2 is a rear view of said envelope, as constructed from the blank of Fig. 1;

Fig. 3 is a sectional view, the section being taken along the line 3—3 of Fig. 2;

Fig. 4 is a plan view of an enclosure which has been cut or folded to a size and shape suitable for use with the envelope of Fig. 2;

Fig. 5 is a rear view of said envelope in which said enclosure has been inserted, before closing;

Fig. 6 is a sectional view, the section being taken along the line 6—6 of Fig. 5;

Fig. 7 is a rear view of the closed envelope;

Fig. 8 is a sectional view, the section being taken along the line 8—8 of Fig. 7;

Fig. 9 is a front view of the closed envelope;

Fig. 10 is an edgewise or sectional view of the closed envelope, showing the manner in which the same is gripped by the recipient thereof, for exertion of the fracturing pull;

Fig. 11 is a front view of the envelope, in process of being opened and having its enclosure extracted;

Figure 12:
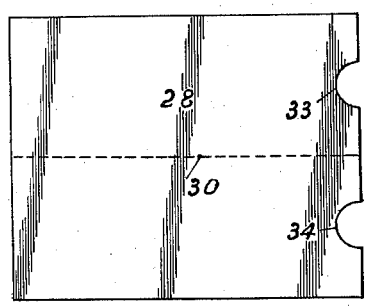
Figs. 12 and 13 are plan views of different forms of enclosures which are usable with an envelope embodying the invention.

In the embodiment of my invention shown by Figs. 1 to 11 the envelope is made from a blank (Fig. 1) having a front face 1, a back 2, and a flap 3. To form the envelope, the blank is folded along the line 4, and after folding along the lines 5 and 6, the adhesive strips 7 and 8 projecting from the face 1 are stuck against the back 2. The latter has a tab 9, the length of which is such that it extends beyond the line 10 along which the flap 3 has to be folded for closing the envelope. Said flap has a gummed portion 11 in the shape of a peripheral band, extending over almost the entire surface of the flap.

On the front face 1 and the back 2, before or after the formation of the envelope, are made two substantially identical lines of perforations 12 and 13. Said lines of perforations are in all cases substantially in register when the envelope is formed. In the embodiment described, they each have an oblique portion 14 and 15 projecting respectively from the corners 16 and 17 of the envelope, and a portion 18 parallel with the end 19 of said envelope. The central zone of the portion 18 preferably provides a distinct discontinuity of the envelope material, as by forming in the latter a definite cut or slit of appreciable length, or by providing at this point a perforation, circular or otherwise, of relatively large size.

An enclosure 20 for use in the envelope just described, is shown in Fig. 4. Said enclosure is such, or is folded in such a manner that after being inserted in the envelope, it does not extend beyond the folding line 21 of the tab 9. After insertion of the enclosure, the tab is turned over inwardly by folding about the line 21.

The envelope can then be closed by folding the flap 3 along the line 10 and by sticking the gummed portion 11 on the back 2.

The address on the envelope is preferably written on the face 1. Said face also carries indications which draw attention to the middle portions of the ends 19 and 19ª of the closed envelope. Such indications may consist for example of printed spots or zones 22 and 23, with arrows 24 and 25 directed towards the ends of the envelope, along the axis of the same perpendicular to the cuts 18.

When it is desired to open the envelope, it is gripped by the thumb and the forefinger of each hand on the printed spots or zones 22 and 23.

Referring to Fig. 10, it will be seen that between the thumb and the forefinger of the left hand are pinched the face and the back of the envelope as well as the enclosure 20. Between the thumb and the forefinger of the right hand are pinched only the end extremities of the face 1 and the closure flap 3, in the absence of the enclosure 20 which cannot reach the gripping point owing to its being held by the tab 9. If a sharp pull is then given, the envelope will tear on its face and its back along the perforations 12 and 13. There remain in the left hand the two small trapezoidal-shaped portions 26 and 27 of the face 1 and the back 2, between which is held the enclosure 20. In the right hand there is then held the major portion of the envelope. By continuing the movement, the enclosure 20 is extracted from the envelope. It can therefore be seen that by means of a simple pull, the opening of the envelope and the extraction of the enclosure are obtained at the same time.

The cleanly-opened major portion of the envelope can serve, if desired, as a convenient sheath for the enclosure 20 which is always readily withdrawable therefrom, because it projects from the opening of said sheath owing to the latter's concave line of fracture.

Figure 13:
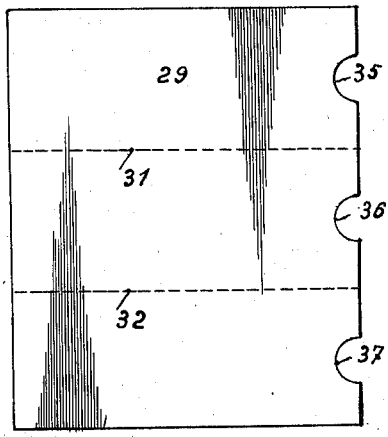

Sheets or enclosures such as 28, shown in Fig. 12, or 29, shown in Fig. 13 which have a length substantially equal to that of the closed envelope, can be used, after folding along the line 30 for the sheet 28 and the lines 31 and 32 for the sheet 29, with an envelope of the type of the one just described but in which the tab 9 is eliminated.

The sheet 28 has semi-circular recesses 33 and 34, which are superposed after the sheet has been folded along the line 30.

The sheet 29 has similar recesses 35, 36 and 37, which are likewise superposed after the said sheet has been folded along the lines 31 and 32.

The sheet 28 or the sheet 29 is introduced into the envelope by first inserting the non-recessed side. The flap 3 is then folded in the usual manner and stuck. When the envelope (Fig. 14) is gripped at the indicated zones 22, 23 of its two ends, for opening same, the pinching of the flap 3 and adjacent envelope material, with the fingers of one of the hands, does not affect the sheet inside owing to the recess in the latter. A pull therefore causes the opening as described above as well as the extraction of the sheet.

Figure 14:
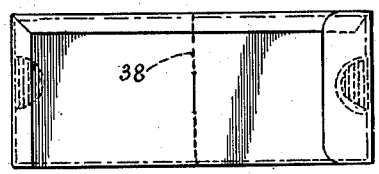
Fig. 14 is a rear view of an envelope of my invention wherein has been inserted an enclosure of the form depicted by Fig. 12 or by Fig. 13.

In Fig. 14, an envelope of this type has been shown, but in which the perforations forming the zones of lesser resistance are not placed at one end of the envelope, but at the centre of same, such as shown at 38.

Figure 17:
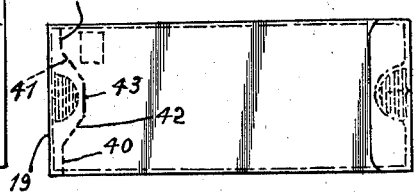
Fig. 17 is a view similar to Fig. 14, illustrating a slight modification of the envelope structure.

In Fig. 17, an envelope has been shown which is also of this type, but in which the perforations include portions 39 and 40 parallel with the end 19, and two oblique portions 41 and 42 connected together by a central cut 43. This shape of perforation reserves a space for the postage stamp.

Figure 15:
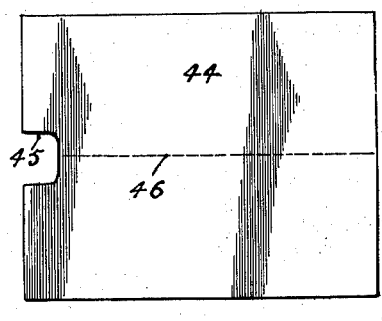
Fig. 15 is a plan view of another modification of the enclosure.

The sheet or enclosure 44 shown in Fig. 15 has on one of its sides a recess 45 and is intended to be folded along the line 46 which ends at the centre of said recess.

Figure 16:
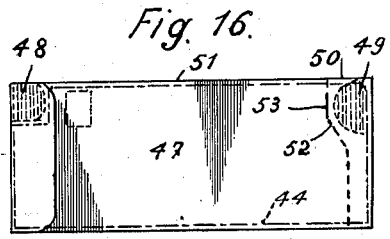
Fig. 16 is a rear view of an envelope of my invention wherein has been inserted an enclosure such as depicted in Fig. 15.

The envelope 47 which co-operates with this sheet is shown in Fig. 16. When the sheet 44 is inserted in said envelope, the corner 48 of the latter is left empty. It is this corner which is printed or otherwise marked as one of the gripping places of the envelope, for opening same. The other gripping place 49 is located towards the corner 50 which is at the other end of the longest side 51 of the envelope. The perforations 52 forming the zone of lesser strength have a cut 53 placed at the intersection of the line along which the pull is exerted.

It is obvious that the folding which forms the envelope from a paper blank can be different from the one described. Furthermore, the division of the envelope into two parts for opening, need not be effected parallel or substantially parallel with the small side of the envelope, but can be effected parallel or substantially parallel with the large side, or even diagonally.

In another modification, after folding if necessary, the sheet is the same size as the envelope and has a perforated line parallel with one of its sides. It is inserted into the envelope by its side which is not adjacent the perforated line.

When the pull is exerted, the envelope opens by breaking as has been described, and simultaneously the sheet is divided into two parts, one of which is formed by the narrow strip limited by the perforation and which does not bear any writing or inscription and remains inside the envelope.

I claim:

1. A letter envelope comprising, a front wall and a rear wall connected together except at an introduction opening, a flap prolonging the front wall beyond said opening, a zone of less resistance with respect to a pull exerted transverse to the line of attachment of the flap, and means for preventing a sheet inside of the envelope from filling it completely in a transverse direction to the line of attachment.

2. An envelope in accordance with claim 1 wherein the means comprises a tab prolonging the rear wall which when folded into the interior of the envelope restrains the sheet from coming out of the zone adjacent the line of attachment of the flap.

3. An envelope in accordance with claim 1 wherein the means comprises a tab prolonging the rear wall and of such a length that it passes the line of attachment of the flap and when folded toward the interior restrains the sheet inside of the envelope from coming out of the zone adjacent the line of attachment.

4. An envelope in accordance with claim 1 in which the zone of less resistance provides a discontinuance of the envelope material at its intersection with the line of application of the pulling effort.

5. An envelope in accordance with claim 1 in which the zone of less resistance is trapezoidal shaped.

6. An envelope in accordance with claim 1 in which the zone of less resistance is constituted by two series of perforations directed obliquely with respect to the line of application of the pulling effort and connected together by a complete interruption perpendicular to said line.

7. A letter composed of an envelope comprising, a front wall and a rear wall connected together except at an introduction opening, a flap prolonging the front wall, a zone of less resistance with respect to a pull exerted transverse to the line of attachment of said flap and a sheet inside of the envelope, and means provided to prevent the sheet from filling the envelope completely in the direction transverse to the said line of attachment.

8. An envelope in accordance with claim 1, in which the means comprises adhesion of the front and rear walls of the envelope between said zone of less resistance and one end of the envelope.

9. An envelope in accordance with claim 7, in which the means comprises adhesion of the front and rear walls of the envelope at the end of same remote from said flap.

GEORGES ALFRED HIPPOLYTE NUYTS.